UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BEVERAGE EXTRACTS.

1,189,132. Specification of Letters Patent. Patented June 27, 1916.

No Drawing. Application filed December 18, 1915. Serial No. 67,508.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Beverage Extracts, (Case M,) of which the following is a specification.

My invention relates in general to the manufacture of beverage extracts quickly soluble in water from the algarroba bean in combination with starch-bearing materials such as wheat, bran, rye, barley and other cereals, beans, peas, nuts, taro and arrow root. These extracts are intended to be dissolved in water to be used as a healthful beverage in place of coffee or other beverages less healthful.

In two prior similarly entitled applications for patents executed by me on September 13, 1915, filed and distinguished as cases I and K respectively, I have described and broadly claimed the manufacture of a soluble extract from roasted algarroba bean and a roasted cereal or other starch-bearing material. In performing the specific process described in said applications as the preferred method of making said extract, I caramelized an extract made from the roasted and comminuted algarroba bean, mixed said caramelized extract with, by preference, roasted wheat bran, then combined this mixture with a roasted and comminuted cereal, preferably a mixture of wheat and rye, and finally extracted and dried as usual the soluble contents of the whole mixture.

In the performance of my present invention I prefer also to make and caramelize an extract of roasted and comminuted algarroba bean, as described in said prior applications. This caramelized algarroba extract is then mixed with bran, the mixture roasted and the soluble contents extracted from the mixture by percolation and concentration in the usual way. Wheat, rye or other cereals or starch-bearing materials, particularly soy beans, are then roasted and comminuted, and the soluble contents thereof extracted and concentrated. The caramelized algarroba and bran extract is then mixed with the starchy matter extract, and the mixture of extracts evaporated to dryness by the usual methods.

In the present preferred method of carrying my invention into practice, the algarroba beans in sufficient quantity are first thoroughly washed and dried, roasted and ground into a coarse powder. The pulverized, dried and roasted algarroba beans are then steeped in hot water and all the extractive material is washed from the product by means of percolation. This algarroba extract is then evaporated to a thick syrup, preferably in a vacuum drier, to a density of 30° to 40° B. This syrup is then caramelized by the usual methods until it has a bitterish sweet flavor and is of a very dark color, similar to the color found in commercial caramel. This caramelized algarroba extract is then mixed with bran in equal proportions by weight. This mixture of bran and caramelized algarroba extract is then roasted in the usual manner, and the soluble contents thereof extracted and concentrated as usual. A sufficient quantity of wheat, rye, soy beans or other cereal or starch-bearing material is then roasted and comminuted, and the soluble contents thereof extracted and concentrated. Two parts of the starchy matter extract is then mixed with one-quarter part of the caramelized algarroba and bran extract, and the mixture of extracts placed in a vacuum drier and dried into a soluble powder in the usual way; the resulting product is quickly soluble in water, is very palatable and healthful, has the general flavor and characteristics of coffee, and is in other respects an improved coffee substitute.

I claim as my invention:

The process of making a solid beverage extract which comprises roasting and comminuting algarroba beans and extracting, concentrating and caramelizing the soluble contents thereof; mixing the caramelized algarroba extract with bran; roasting the mixture of algarroba extract and bran and extracting and concentrating the soluble contents thereof; roasting and comminuting starch-bearing material, and extracting and concentrating the soluble contents thereof; mixing the algarroba and bran extract and the starchy matter extract together, and evaporating the mixture of extracts.

JOHN LEONARD KELLOGG.